United States Patent [19]

Wegner et al.

[11] Patent Number: 5,035,763
[45] Date of Patent: Jul. 30, 1991

[54] PREPARATION OF THIN FILMS

[75] Inventors: Gerhard Wegner, Mainz-Drais; Gisela Duda, Mainz; Christoph Bubeck, Eltville, all of Fed. Rep. of Germany; Arend J. Schouten, Peize, Netherlands

[73] Assignee: BASF Aktiengesellschaft, Ludwigshafen, Fed. Rep. of Germany

[21] Appl. No.: 223,018

[22] Filed: Jul. 22, 1988

[30] Foreign Application Priority Data

Jul. 24, 1987 [DE] Fed. Rep. of Germany ....... 3724542

[51] Int. Cl.$^5$ .............................................. B32B 31/04
[52] U.S. Cl. .................................. 156/230; 156/246; 156/249; 156/306.3; 264/298; 427/434.3
[58] Field of Search .............. 156/230, 231, 249, 245, 156/246, 306.3, 427/407.1, 58, 402, 434.3, 434.5, 434.4; 264/298, 212

[56] References Cited

U.S. PATENT DOCUMENTS 3,551,244 12/1970 Forester et al. ..................... 264/212
3,933,561 1/1976 Larson et al. ........................ 150/246
4,584,235 4/1986 Roberts et al. ........................ 427/58
4,632,800 12/1986 Barraud et al. ..................... 427/402

FOREIGN PATENT DOCUMENTS 6500089 7/1965 Netherlands .

OTHER PUBLICATIONS

Takenada et al., J. Coll. Sci. #73, p. 569, 1970.
Takeda et al., J. Coll. Sci. #84, No. 1, 1981, S. 220ff.
Mumby et al., Macromolecules, #19, 1986, S. 1054ff.
Stroeve et al., Thin Solid Films, vol. 146 (1987) pp. 209-220.
Kuhn et al., Angewandte Chemie, vol. 83, (1971) pp. 672-689.
European Search Report.
J. Watanabe, Y. Fukuda, R. Gehani & J. Nematyu, Macromolecules 17, 1984, 1004ff
G. L. Gaines, Insoluble Monolayers et Liquid-Gas-Interfaces, Interscience Publishers, 1966.
W. E. Goode et al., J. Pol. Sci. 46, 317 (1960) 47,75.
J. L. Houben, A. Fissi, D. Baccrola, N. Rosato & O. Pieroni, F. Ciardelli, Int. J. Biol. Macromol. 5, 94 (1983).

Primary Examiner—Caleb Weston
Attorney, Agent, or Firm—Keil & Weinkauf

[57] ABSTRACT

Thin films which contain a defined concentration of dye per unit area and are useful as layer elements, e.g. for optical filters, are prepared by spreading an oleophilic dye which is soluble in an organic water-immiscible solvent and an organic polymer dissolved in an organic solvent as a thin film at the water/air interface and, after the solvent has evaporated, transferring said film by the Langmuir-Blodgett technique to a solid base material.

20 Claims, No Drawings

PREPARATION OF THIN FILMS

The present invention relates to a process for preparing thin films by the Langmuir-Blodgett technique which have a defined concentration of dye per unit area.

The production of mono- and multimolecular films by the Langmuir-Blodgett technique has been known for a long time.

The transfer of poly(γ-benzyl L-glutamate) and of poly(γ-methyl L-glutamate) monolayers to germanium substrates and the investigation of the orientation of these layers by means of polarized IR spectroscopy were for example described long ago by T. Takenada, K. Harada and M. Matsumoto in J. Coll. Int. Sci. 73 (1979), 569 and by F. Takeda, M. Matsumoto, T. Takenaka and Y. Fujiyoshi in J. Coll. Int. Sci. 87 (1981), 220. The orientation of polyoctadecyl methacrylate and polyoctadecyl acrylate in Langmuir-Blodgett monolayers has been studied by S. J. Mumby et al. (Macromolecules 19 (1986), 1054).

Amphiphilic dyes in layers of amphiphilic surface-active molecules were described by H. Kuhn and D. Möbius in Angew. Chem. 83 (1971), 672 ff.

It is an object of the present invention to describe a process whereby it is possible to apply thin films containing a defined concentration of oleophilic dyes to solid substrates by the Langmuir-Blodgett technique and in this way to obtain uniform colored layers whose coloring is reproducibly controllable via dye concentration and film thickness.

We have found, surprisingly, that this object is achieved when oleophilic dyes which are soluble in organic water-immiscible solvents are spread out mixed with the solution of an organic polymer at the water/air interface and the monolayer obtained on evaporation of the organic solvent is transferred to a solid base material by the Langmuir-Blodgett technique.

In the monolayer the oleophilic dye is evidently present embedded or dissolved in the polymer; that is, the monolayer obtained comprises a homogeneous mixture of dye and polymer. As a result, uniform thin films containing a defined concentration of dye per unit area are reproducibly preparable not only via variation of the dye concentration but also via the film thickness (number of monolayers).

The present invention accordingly provides a process for preparing a thin film containing a defined concentration of dye per unit area, which comprises spreading an oleophilic dye which is soluble in an organic water-immiscible solvent and an organic polymer dissolved in an organic water-immiscible solvent as a thin film at the water/air interface and, after the solvent has evaporated, transferring said film by the Langmuir-Blodgett technique to a solid base material.

Suitable dyes are preferably those which are water-insoluble and on their own do not form ordered structures at the water/air interface.

Suitable organic polymers are not only polycondensates such as, for example, polyglutamates with long-chain substitution in the γ-position, preferably copolyglutamates with different alkyl substituents in the γ-position, but also generally those organic polymers which contain long-chain n-alkyl side groups bonded exclusively via polar groups to the main chain of the polymer, with the proviso that these long-chain n-alkyl side groups are partly replaced by shorter-chain n-alkyl side groups, by branched alkyl side groups having the same or a smaller number of carbon atoms and/or by equally long or shorter side groups having at least one C—C multiple bond, thus for example also copolymers having long-chain side groups. These polar groups comprise the groups

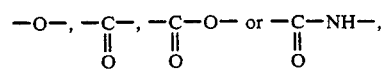

preferably the group

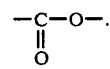

The process according to the invention may also be followed by a heat treatment.

The present invention also provides a layer element prepared by the process according to the invention using the homogeneous mixture of an oleophilic dye and an organic polymer.

In what follows, the process according to the invention and the materials used will be discussed in detail.

The oleophilic dyes to be used for the purposes of the invention are in general those which are insoluble in water but soluble in water-immiscible organic solvents, in particular those dyes which on their own do not form ordered structures at the water/air interface.

Examples of suitable oleophilic dyes are:

dyes on a hydrocarbon basis and derivatives thereof without ionic or hydrophilic groups, for example carotenes, such as β-carotene, carotenecarboxylic esters, such as (trans) ethyl β-apo-8'-carotenecarboxylate, oleophilic dyes from the class of the Sudan dyes, preferably disazo dyes, in particular those which are substituted by at least one alkyl (e.g. methyl or ethyl) in the ortho-position relative to the azo group, for example Oil Red C.I. Solvent Red 27 (C.I. No. 26,125) or Fat Red C.I. Solvent Red 10 (C.I. No. 26,050) and other dyes of this kind (C.I.=Colour Index of the Society of Dyers and Colourists).

Unsuitable for the process according to the invention are dyes having ionic groups, for example ethidium bromide. Even dyes having a predominant proportion of polar groups are less suitable.

The oleophilic dye can be used in from small amounts up to amounts where the liquid analogue state of the organic polymer to be used according to the invention is not yet disrupted.

The oleophilic dye can be considered dissolved in the side chains of the organic polymer suitable for forming Langmuir-Blodgett layers.

Suitable organic polymers comprise not only copolymers but also polycondensates.

Examples of copolymers are:

polyvinyl alkyl ethers of from 12 to 36 carbon atoms in the n-alkyl chain, such as polyvinyl octadecyl ether whose straight-chain octadecyl groups may be partly replaced by for example hexadecyl, dodecyl, decyl, nonyl, octyl, hexyl, n-butyl or isobutyl groups, corresponding copolymers of polyvinyl alkyl ketones of different chain lengths, poly-N-alkyl acrylamides or poly-N-alkylmethacrylamides where the long-chain n-alkyl groups may contain from 12 to 36 carbon atoms and are partly replaced by n-alkyl radicals of shorter chain lengths of branched alkyl radicals, polymeric esters of acrylic acid, methacrylic acid or other copolymerizable α,β-ethylenically unsaturated monocarboxylic acids with straight-chain alkyl groups containing no fewer than 12, preferably from 16 to 36, carbon atoms, some of these long-chain n-alkyl groups being replaced by n-alkyl groups having an alkyl radical shorter by at least one, preferably from 2 to 8, carbon atoms, by branched alkyl groups having the same or a smaller number of carbon atoms in the alkyl radical, or by hydrocarbon radicals having the same or a smaller number of carbon atoms, these hydrocarbon radicals containing one or more C—C multiple bonds, for example —HC=CH— or —C≡C— groups; C—C multiple bonds can conveniently be introduced by polymer-analoguos reaction.

Examples of long-chain n-alkyl (meth)acrylates (a) are docosyl (meth)acrylate, eicosyl (meth)acrylate, octadecyl (meth)acrylate, hexadecyl (meth)acrylate, tetradecyl (meth)acrylate and dodecyl (meth)acrylate.

In the copolymers to be used according to the invention, such long-chain n-alkyl (meth)acrylates are partly replaced by n-alkyl (meth)acrylates having shorter n-alkyl radicals, by those having branched alkyl radicals or by those having C—C multiple bonds.

The proportion of components (a) and (b) present as copolymerized units in the copolymer can vary within wide limits and is in general within from 50 to 99.5 mol % of component (a) and from 0.5 to 50 mol % of component (b).

Preference is given to copolymers containing from 80 to 99.5, in particular from 85 to 99, mol % of component (a) and from 0.5 to 20, in particular from 1 to 15, mol % of component (b).

Particular suitability is possessed by copolymers of octadecyl (meth)acrylate with hexadecyl (meth)acrylate, dodecyl (meth)acrylate, decyl (meth)acrylate, nonyl (meth)acrylate, octyl or isooctyl (meth)acrylate, hexyl (meth)acrylate, butyl (meth)acrylate or else methyl (meth)acrylate.

They are thus copolymers where the amount of modifying comonomers (b) can vary according to chain lengths.

(Meth)acrylic ester copolymers are preferred.

The copolymers to be used according to the invention in general have degrees of polymerization of from 10 to 200. Preference is given to isotactic copolymers.

Suitable polycondensates also include homocondensates, for example those of long-chain γ-glutamates, such as the polycondensates of γ-octadecyl L-glutamate.

Suitable polycondensates having different side chains are for example polyesters and in particular polyamides. As regards the selection and combination of the side chains, the remarks made concerning the copolymers apply, mutatis mutandis. Of the polyamides, in particular the polyglutamates which contain different ester groups in the γ-position are suitable. Preference is given to poly(γ-octadecyl L-glutamates), whose octadecyl groups have been partly, for example to an extent of from 2 to 80 mol %, replaced by n-alkyl groups having fewer than 18, preferably from 1 to 16, carbon atoms or corresponding branched alkyl radicals or hydrocarbon radicals having C—C multiple bonds.

An example of such polycondensates is the copolycondensate of γ-methyl L-glutamate and γ-octadecyl L-glutamate. Such copolycondensates can be prepared by polymer-analogous conversion of polymeric homocondensates, for example by partial transesterification of poly(γ-methyl L-glutamate) with stearyl alcohol (cf. J. Watanabe, Y. Fukuda, R. Gehani and I. Nematyn, Macromolecules 17 (1984), 1004 ff).

The Langmuir-Blodgett technique, apparatus suitable therefor and the preconditions for implementing this method are known, being described for example in G. L. Gaines, Insoluble Monolayers at Liquid-Gas Interfaces, Interscience Publishers, 1966; reference is made in particular to pages 44 to 68, 326 to 330 and 336 to 340 of this monograph.

The transfer of the monolayers generally takes place in the liquid analogue state.

The organic polymers are advantageously dissolved in highly volatile organic solvents, such as methylene chloride, chloroform, benzene, hexane or ethyl acetate in concentrations of 0.01 to 1% by weight, the solvent removed by evaporation from the polymer solution applied to the water surface, and the monolayer precompressed in a conventional manner prior to the transfer to solid base materials.

The process is carried out in general at from 5° to 35° C., preferably at from 10° to 30° C.

The base material on which the layer element according to the invention is built by applying thereto organic polymers in thin, ordered layers of well-defined structure can be any desired solid, preferably dimensionally stable, substrate from any of a wide range of materials. The substrates used as base materials can be for example transparent or opaque, electroconductive or insulating. The surface of the substrate to which the thin layer of organic polymer is applied may have been hydrophobized. The substrate can be made of a hydrophobic material or the surface of the substrate can be hydrophobized in a conventional manner by a suitable pretreatment before application of the thin layer of organic polymer. The hydrophobic surface of the substrate to be coated should be as clean as possible, so as not to disrupt the formation of a thin, ordered layer, in particular a monomolecular or multimolecular layer structure. For example, if surface-active substances are present on the substrate surface to be coated, the formation of a good monomolecular or multimolecular film can be impaired. However, before application of the thin layer of organic polymer the surface of the substrate used as base material to be coated can first be coated with an intermediate layer, for example to promote high adhesion between the solid, thin layer of organic polymer and the substrate.

Suitable materials for the substrates used as base materials are for example metals, such as gold, platinum, nickel, palladium, aluminum, chromium, niobium, tantalum, titanium, steel and the like. Other suitable materials for the substrates include, inter alia, plastics, such as polyesters, e.g. polyethylene terephthalate or polybutylene terephthalate, polyvinyl chloride, polyvinylidene chloride, polytetrafluoroethylene, etc..

It is also possible for example to use silicon, glass, silicon dioxide, ceramic materials or cellulose products as materials for the substrates. The surface of a glass substrate can if necessary be hydrophobized in a conventional manner, for example by reaction with alkylsilanes. Which substrate material is chosen depends among other things chiefly on the end use of the layer element according to the invention. In the case of optical elements, the base material is generally a transparent substrate. If the layer elements according to the invention used for example in electrical engineering or in electrochemical processes, the substrates used are in particular electroconductive materials, such as metals, or materials having electroconductive, in particular metallic, surface layers, for example metallized plastics films.

The substrates used as base materials for the layer elements according to the invention can have any desired shape, depending on the end use. For example, they can be filmlike, sheetlike, platelike, tapelike or even cylindrical or have any other desired shape. In general, the base materials will comprise flat, planar substrates, for example films, sheets, plates, tapes, panels and the like. The substrate surface to be coated is preferably smooth, as is customary for the production of thin ordered layers of well-defined structure, in particular monomolecular or multimolecular films. In the case of flat planar substrates, such as films, sheets, tapes, etc., the thin, ordered layers according to the invention can be applied only to one or to both surfaces of the substrate.

It can be advantageous to follow the transfer of the monomolecular film from the water surface to the substrate by immediately subjecting the resulting layer element according to the invention to a heat treatment at elevated temperatures, in general within the range from 50° to 200° C., preferably within the range from about 100° to 150° C. Depending on the type and thickness of the layer element according to the invention, the heat treatment can take for example from a few minutes to some hours.

Suitable organic polymers also include metallomacrocyclic polymers, such as phthalocyaninate polymetaloxanes, as described for example in DE-A-3,615,832.

The oleophilic dye/organic polymer mixing ratio can vary within the abovementioned limits. Per polymer repeat unit (=mole of fundamental unit of polymer) it is possible to use, depending on the dye system, for example up to from about 0.5 to 1 mole of oleophilic dye, the lower value (0.5) applying for example to carotenecarboxylic esters and the higher value (1) to oleophilic disazo dyes. It is of course also possible if desired to use smaller amounts of oleophilic dye or, as the case may be, dye mixture for the process according to the invention.

Using the process according to the invention it is possible to prepare in a reproducible manner very thin dye/polymer films which are anisotropic, which have no domain structure, and the color intensity of which is controllable via the number of Langmuir-Blodgett layers applied. The process according to the invention permits γ-transfer (up to 40 or more layers) at a constant transfer ratio.

The films produced by the process according to the invention are very useful as optical filters.

If the preparation of the layer elements according to the invention is followed by heat treatment, the properties of the layer elements according to the invention can be stabilized or even varied in a specific manner.

The invention is further illustrated by the Examples below. Parts and percentages are by weight, unless otherwise stated.

Synthesis of Polymethacrylates

An isotactic copolymer of octadecyl methacrylate and hexadecyl methacrylate was anionically polymerized using phenylmagnesium bromide as an initiator (by the method of W. E. Goode et al., J. Polym. Sci. 46 (1960), 317 and 47 (1960), 75,. After the polymeriztion the copolymer was worked up by precipitation in methanol and purified by repeated reprecipitation from toluene in methanol. The copolymer was finally dried at room temperature under reduced pressure.

Synthesis of Polypeptides

1. Copolycondensate of γ-methyl L-glutamate and γ-stearyl L-glutamate

The poly(γ-methyl L-glutamate) was prepared from the N-carboxyanhydride compound of the ω-methyl ester of L-glutamic acid by polymerization in dioxane at room temperature using triethylamine as initiator. The N-carboxyanhydride compound had been prepared by phosgenation of the ω-methyl ester of L-glutamic acid in dioxane (J. L. Houben, A. Fissi, D. Baccrola, N. Rosato and O. Pieroni and F. Ciardelli, Int. J. Biol. Macromol. 5 (1983), 94. The degree of stearyl substitution (35%) was determined by elemental analysis.

The copolycondensate was prepared from poly(γ-methyl L-glutamate) by reaction with stearyl alcohol at 60° C. The catalyst used was p-toluenesulfonic acid (J. Watanabe, Y. Fukuda, R. Gehani and I. Nematyu, Macromolecules 17 (1984), 1004). The molecular weight (12000) was determined by GPC using polystyrene as standard.

2. Poly(γ-stearyl L-glutamate)

The homopolymer was prepared in the same way as the poly(γ-methyl L-glutamate). The ω-stearyl ester of L-glutamic acid was prepared from L-glutamic acid and stearyl alcohol in t-butanol at 80° C. using concentrated sulfuric acid as catalyst (Neth. Appl. 6, 500, 089, July 7, 1965; CA, 64 (1966), 2159 g).

Molecular weights of polymers:

| | $\overline{M}_n \times 10^3$ | |
|---|---|---|
| isotactic copolymer of octadecyl methacrylate and hexadecyl methacrylate | 8 | (including 5 mol % of hexadecyl methacrylate units) |
| poly(γ-octadecyl L-glutamate) | 3* | |
| copolycocondensate of γ-octadecyl L-glutamate and γ-methyl L-glutamate | ≈12* | (containing 35 mol % of octadecyl L-glutamate units) |

*from GPC, based on polystyrene

EXAMPLE 1

100 μl of a 0.1% strength solution of a copolycondenate of γ-octadecyl L-glutamate and γ-methyl L-glutamate and the corresponding molar amount of Fat Red C.I. Solvent Red 19 (C.I. No. 26,050) in chloroform (Uvasol grade) were spread as a thin film at 25° C. on the water surface of a Lauda Langmuir film balance in a conventional manner. After the solvent had evaporated, the layer was compressed until the surface pressure read 20 mN/m. The layer was stabilized at this pressure for about 1 hour. When the occupied surface area remained constant, a quartz platelet which had been hydrophobized with hexamethyldisilazane was immersed vertically by the Langmuir-Blodgett method and withdrawn at a speed of 25 mm/min. The first layer was transferred during immersion, the next layer during withdrawal (Y-transfer). The transfer in the course of the next cycles was monitored with a recorder. The set pauses were: immersed 34 seconds, out of water 68 seconds. In this way it was possible to apply no fewer than 49 layers with a constant transfer ratio. A completely homogeneous coloring was obtained, in which the dye was oriented in the layer.

COMPARATIVE EXAMPLE 1

Example 1 was repeated, except that the dye used comprised the corresponding molar amount of ethidium bromide. The dye was not incorporated into the Langmuir-Blodgett matrix.

EXAMPLE 2

Example 1 was repeated, except that the oleophilic dye used was β-carotene (corresponding molar quantity), the temperature was 20° C. and the pressure was 25 mN/m. This gave homogeneously colored layers in which the dye was oriented.

EXAMPLE 3

Example 1 was repeated, except that the organic polymer used was the homopolymer poly(γ-octadecyl L-glutamate). Uniformly colored layers were obtained, in which the dye was oriented.

EXAMPLE 4

Example 1 was repeated, except that the oleophilic dye used was Oil Red O (C.I. Solvent Red 27; C.I. No. 26,125) in the molar amount corresponding to the molar fundamental unit of the copolycondensate. This gave homogeneous, uniformly colored layers in which the dye was oriented.

EXAMPLE 5

Example 1 was repeated, except that the oleophilic dye used was (trans) ethyl β-apo-8'-carotenate in a 0.5 molar amount, based on the fundamental molar unit of the copolycondensate. This again gave homogeneously colored layers containing oriented dye.

EXAMPLE 6

Example 1 was repeated, except that the oleophilic dye used was β-carotene, in an amount of 2 mol %, and the polymer used was a copolymer of octadecyl methacrylate and hexadecyl methacrylate (see above Table). The surface pressure was 10 mN/m. Uniformly colored homogeneous layers were obtained.

We claim:

1. In a process for forming a thin film of an organic polymer on a solid base by the Langmuir-Blodgett technique, wherein a solution of the organic polymer in an organic water-immiscible solvent is spread at a water-/air interface as a thin film, the solvent is evaporated and the film is transferred to the solid base, the improvement which comprises: including in the solution to be spread at the water/air interface an olephilic dye having no ionic groups, whereby a thin film is formed on the base having a defined concentration of dye per unit area.

2. A process as defined in claim 1, wherein the dye used is water-insoluble and on its own does not form ordered structures at the water/air interface.

3. A process as defined in claim 1, wherein the organic polymer used is a polyglutamate with long-chain substitution in the γ-position.

4. A process as defined in claim 2, wherein the organic polymer used is a polyglutamate with long-chain substitution in the γ-position.

5. A process as defined in claim 1, wherein the organic polymer used contains long-chain n-alkyl groups bonded exclusively via polar groups to the main chain of the polymer, and in which the long-chain n-alkyl side groups are partly replaced by shorter-chain n-alkyl side groups, by branched alkyl side groups having the same or a smaller number of carbon atoms and/or by equally long or shorter side groups having at least one C—C multiple bond.

6. A process as defined in claim 2, wherein the organic polymer used contains long-chain n-alkyl groups bonded exclusively via polar groups to the main chain of the polymer, and in which the long-chain n-alkyl side groups are partly replaced by shorter-chain n-alkyl side groups, by branched alkyl side groups having the same or a smaller number of carbon atoms and/or by equally long or shorter side groups having at least one C—C multiple bond.

7. A process as defined in claim 5, wherein the polar groups are

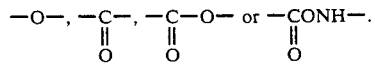

8. A process as defined in claim 6, wherein the polar groups are

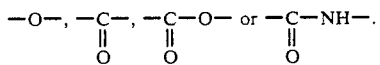

9. A process as defined in claim 5, wherein the organic polymer having long-chain side groups is a copolymer.

10. A process as defined in claim 5, wherein the organic polymer having long-chain side groups is a polycondensate.

11. A process as defined in claim 10, wherein the polycondensate having long-chain side groups is a copolyglutamate with different alkyl substituents in the γ-position.

12. A process as defined in claim 9, wherein the copolymer comprises
 (a) polymerized units of an ethylenically unsaturated compound containing n-alkyl ester groups having no fewer than 12 carbon atoms in the alkyl radical of the ester group and
 (b) polymerized units of at least one further polar ethylenically unsaturated compound different from (a) which contains alkyl ester groups in which the alkyl radical of the ester group either has fewer carbon atoms than that of (a), or is branched or contains at least C—C multiple bond.

13. A process as defined in claim 12, wherein, in the copolymer, the polymerizable ethylenically unsaturated compound (a) containing N-alkyl ester groups is an alkyl acrylate or methacrylate which is present as copolymerized units.

14. A process as defined in claim 9, wherein the copolymer used as the organic polymer has a degree of polymerization of from 10 to 200.

15. A process as defined in claim 9, wherein the copolymer used as the organic polymer is isotactic.

16. A process as defined in claim 12, wherein the copolymer contains as component (b) copolymerized units of an ester of (meth)acrylic acid where the alkyl radical of the ester group is no fewer than 4 carbon atoms shorter than the n-alkyl radical of the ester group of component (a).

17. A process as defined in claim 1, wherein the organic polymer used is a polycondensate of helical structure.

18. A process as defined in claim 11, wherein the polycondensate used is a copolycondensate of γ-alkyl L-glutamate and γ-alkyl' L-glutamate where alkyl is alkyl of from 1 to 6 carbon atoms and alkyl' is alkyl of from 12 to 36 carbon atoms.

19. A process as defined in claim 18, wherein the polycondensate used is a copolycondensate of γ-methyl L-glutamate and γ-octadecyl L-glutamate.

20. A process as defined in claim 1, wherein the application of the thin film to the solid base material is followed by a heat treatment.

* * * * *